3,373,044
CULINARY COMPOSITION CONTAINING ACIDIC LIPID ALKYL CARBONATES
James E. Thompson, Colerain Township, Hamilton County, and Norman B. Howard, Hamilton, Ohio, assignors to The Procter & Gamble Company, Cincinnati, Ohio, a corporation of Ohio
No Drawing. Filed Dec. 17, 1964, Ser. No. 419,234
22 Claims. (Cl. 99—92)

ABSTRACT OF THE DISCLOSURE

Shortening, cake batters, dry cake mixes and the like containing minor amounts of acidic lipid alkyl carbonates.

This invention relates to new compositions of edible matter and, more particularly, to novel compositions containing additives for bakery products such as bread, cakes, pies, doughnuts, cookies, icings, fillings and the like products prepared from emulsions comprising water, fats, proteins and/or carbohydrates.

The volume, texture, and eating qualities of many bakery products are dependent upon the interaction of various ingredients during the mixing operation in which a dough, batter, or other emulsion is formed and the stabilization during subsequent baking and/or storage of the bakery product. Many attempts have been made to improve the emulsion characteristics of bakery products by incorporating therein small amounts of various edible additives which are able to affect the colloidal properties of the proteinaceous, and/or amylaceous, and/or oleaginous bakery constituents. Although a number of the conventional additives such as lecithin and the partial glycerides of higher fatty acids have been found to be useful emulsifiers in bakery products, these emulsifiers have not provided the desired air incorporation and foam stability.

It is, therefore, a primary object of this invention to provide superior air incorporation and foam stability in bakery products prepared from batters, doughs, and other bakery emulsions.

It is a further object to provide means for the preparation of bread, cakes, pies, doughnuts, cookies, icings, fillings, and the like bakery products having improved volume, texture and eating qualities.

Other objects and advantages will be apparent from the disclosure herein.

In accordance with the present invention it has been discovered that improved air incorporation and foam stability in bakery products can be achieved by introducing into the bakery product or a component thereof, a small but effective amount of an acidic lipid alkyl carbonate. The acidic lipid alkyl carbonates of this invention are selected from the group of compounds having the general formula

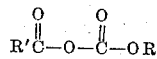

wherein R is selected from the group consisting of alkyl radicals having from 2 to about 20 carbon atoms, and wherein R' is the residue of an acidic lipid selected from the group consisting of (a) A fatty acid having from about 12 to about 22 carbon atoms;
(b) A hydroxy fatty acid having from about 12 to about 22 carbon atoms and from 1 to about 2 hydroxyls;
(c) A condensation product of a fatty acid having from about 12 to about 22 carbon atoms with a hydroxy-polycarboxylic acid having from 1 to 4 hydroxyl groups, said hydroxy-polycarboxylic acid containing 3 to 6 carbon atoms, said condensation product having at least one free carboxyl group per molecule;
(d) A condensation product of a dicarboxylic acid having no hydroxyl groups and containing from about 4 to 6 carbon atoms with a straight chain aliphatic α,ω-diol monoester of fatty acid, said diol containing from 3 to 5 carbon atoms, said fatty acid having from about 12 to about 22 carbon atoms, and said condensation product having at least one free carboxyl group per molecule;
(e) A condensation product of a dicarboxylic acid having no hydroxyl groups and containing from about 4 to 6 carbon atoms with a straight chain aliphatic primary-secondary diol monoester of fatty acid, said diol containing from 3 to 5 carbon atoms, said fatty acid having from about 12 to about 22 carbon atoms, and said condensation product having at least one free carboxyl group per molecule;
(f) A condensation product of a dicarboxylic acid having no hydroxyl groups and containing from about 4 to 6 carbon atoms with a partial fatty acid glyceride containing from one to two fatty acid radicals having from about 12 to about 22 carbon atoms and from zero to one fatty acid radical having from about 2 to about 6 carbon atoms, said condensation product having at least one free carboxyl group per molecule;
(g) A condensation product of fatty acid containing from about 12 to about 22 carbon atoms with an ω-hydroxy-monocarboxylic acid having from 3 to 6 carbon atoms;
(h) A condensation product of a dicarboxylic acid having no hydroxyl groups and containing from about 4 to 6 carbon atoms with a straight chain fatty alcohol having from about 12 to about 22 carbon atoms, said condensation product having at least one free carboxyl group per molecule;
(i) A condensation product of a dicarboxylic acid having no hydroxyl groups and containing from 4 to 6 carbon atoms with a diethylene glycol monoester of fatty acid, said fatty acid having from about 12 to about 22 carbon atoms and said condensation product having at least one free carboxyl group per molecule; and
(j) Mixtures of the above compounds in (a) to (i).

For improving the air incorporation and foam stability in bakery products, these acidic lipid alkyl carbonate additives are used in amounts of from about 0.1% to about 15%, by weight of the bakery product, and preferably from about 0.1% to about 4%, by weight of the flour or shortening in the bakery product. It is also preferable that "R" in the above formula be an alkyl radical having from 2 to about 6 carbon atoms.

The acidic lipid alkyl carbonates of this invention are preferably prepared by reaction of the triethylammonium salts of the above fatty acids (a) and (b) or acidic lipid condensation products (c) through (i) with suitable alkyl chloroformates at low temperatures, such as from about 0° C. to about 25° C. Synthesis of these new compounds can also be accomplished with salts other than the triethylammonium salts, for example, the sodium or potassium salts.

The acidic lipid residue (R'—) in the above formula is derived from fatty acid or acidic lipid condensation products (a) to (i), above, which must contain at least one "long-chain" or "higher" alkyl radical having from about 12 to about 22 carbon atoms and at least one free carboxyl group per molecule. These "long chain" radicals can be derived, for example, from lauric, myristic, palmitic, stearic, oleic, linoleic, linolenic, arachidic, behenic, and erucic acids or from the corresponding long-chain fatty alcohols. A preferred "long chain" alkyl radical has from about 16 to about 18 carbon atoms. The free carboxyl group supplied the

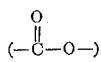

group which is attached to the (R'—) group in the above formula.

In the above acidic lipid condensation products, the hydroxy-polycarboxylic acids in (c) having from 1 to 4 hydroxyl groups and containing from 3 to 6 carbon atoms include, for example, malic, tartaric, citric, citramalic, trihydroxy glutaric, mucic, saccharic, and mannosaccharic acids. The dicarboxylic acids in (d), (e), (f), (h) and (i) having no hydroxyl groups and containing from about 4 to 6 carbon atoms include, for example, succinic, glutaric, and adipic acids. The $\alpha,\omega$-diols in (d) include, for example, 1,3-propanediol, 1,4-butanediol and 1,5-pentanediol. The preferred primary-secondary diol in (e) is propylene glycol. The partial glycerides in (f) include, for example, mono- and distearin, mono- and diolein, dilaurin and monoacetyl monobehenin. The $\omega$-hydroxy-monocarboxylic acids in (g) include, for example, 3-hydroxypropanoic acid, 4-hydroxybutanoic acid, 5-hydroxypentanoic acid and 6-hydroxyhexanoic acid.

The acidic lipid condensation products in (c) through (i) are prepared by reacting appropriate hydroxyl-containing compounds with appropriate carboxyl-containing compounds by conventional esterification reaction methods known to those skilled in the art. Suitable detailed procedures are described, for example, in the co-pending applications of James Bruce Martin, Ser. Nos. 321,292 and 321,331, filed Nov. 4, 1963.

Although it is not desired to be bound by theory, it is believed that the mechanism by which the acidic lipid alkyl carbonates of this invention act in cake batters and other bakery emulsions is by direct chemical reaction with other batter constituents, such as protein, which, in turn, leads to the effective stabilization of the batter, particularly at high temperatures such as ordinary baking temperatures. However, irrespective of the mechanism by which these compounds function in the batter, it has been found that the addition of about 0.1% to about 15%, and preferably about 0.1% to about 4%, by weight of the bakery product, of one or more of these compounds to the batter system increases the air incorporating properties of conventional emulsifiers and stabilizes the cake batter against shrinkage during baking and subsequent cooling of the cake. These stabilization properties give rise to improved cakes of high volume and fine texture.

The acidic lipid alkyl carbonates of this invention can be incorporated into the bakery products by direct addition to a batter, dough, or other shortening-containing emulsion, or by admixture with a dry ingredient in the form of a pre-mix for said batter, dough, or shortening-containing emulsion. In the practice of this invention it has been found that especially desirable results are obtained in many instances by admixing the acidic lipid alkyl carbonates with either an amylaceous, proteinaceous, or oleaginous substance, such as flour or shortening, before employing it in a batter, dough or shortening-containing emulsion. Very good results are also obtained by pre-admixture of the acidic lipid alkyl carbonate with a cake mix comprising shortening, sugar, and flour.

The amylaceous substances which can be employed for this purpose can be a part of or all of the flour normally employed in the preparation of bakery products such as bread, cakes, pastry crusts, cookies, biscuits or rolls. It can also be a substance such as starch which is particularly useful in the preparation of bakery products such as cookies, cake and pie fillings. All types of flours can be used, for example, cake, bread, and pastry flours; bleached and unbleached flours; high or low protein-content flours; flours having high or low phytic acid content; and various other types of flours derived from any of the known grains and cereal sources, such as wheat, corn, rice, barley, rye, etc. For ordinary cake mix purposes, ordinary bleached cake flour is preferred.

The proteinaceous substances which can be employed in the practice of this invention include, by way of example: simple proteins such as the albumins, including egg albumin, the globulins, including whey globulins, the glutelins such as from wheat and other cereals, the prolamines such as zein and gliadin, the albuminoids, such as gelatin, and protamines, such as arginine, as well as conjugated proteins, such as the phosphoproteins, including casein, and the lecithoproteins, including lecithin. The preferred proteins are derived from flour, milk solids, and egg solids.

The oleaginous substances which can be employed in the practice of this invention for admixture with the acidic lipid alkyl carbonates can be plastic, semi-fluid, or liquid glyceride shortenings derived from animal, vegetable, or marine fats and oils. These glycerides can have saturated or unsaturated long-chain fatty acid groups having from about 12 to about 22 carbon atoms such as lauroyl, palmitoyl, stearoyl, oleyoyl, linoleyoyl, linolenoyl, behenoyl, and the like, and are generally obtained from edible fats and oils such as cottonseed, soybean, corn, peanut, coconut, rapeseed, sunflower, sesame seed, safflower, palm, palm kernel, wallflower, rice bran, whale, menhaden, sardine and herring oils as well as lard and tallow. The glycerides can also contain, in part, one or two short-chain fatty acid groups derived from acids such as acetic and propionic acids. These shortenings can be natural oils and fats derived from single sources or they can be mixtures of various oils and fats. These oils and fats can be crystallized or otherwise processed by any of the known methods of shortening preparation and they can be subjected to various interesterification and alcoholysis reactions, for example, such as to produce rearranged lard, coconut, palm, or cottonseed oils or such as to produce cottonseed or soybean oils interesterified with mono- and diglycerides, glycols, glycerols, and sugar alcohols.

The shortening can contain small amounts, for example, up to about 10%, of conventional emulsifiers and other surface active agents such as, for example, the mono- and diglycerides; lactylated long-chain fatty acid glycerol and glycol esters; sorbitan and polyoxyethylene sorbitan esters of long-chain fatty acids; long-chain fatty acid esters of sugars and sugar alcohols such as sucrose and sorbitol; phosphoric and sulfuric acid esters such as dodecyl glyceryl ether sulfate, monostearin phosphate and sodium alkyl sulfate; various higher fatty acid esters of citric and tartaric acids such as citric acid monoglyceride, stearoyl monoglyceridyl citrate, and diacetyl tartaric acid ester of monostearin; and free fatty acids such as stearic acid.

The acidic lipid alkyl carbonates can be incorporated in the shortening by any suitable means whereby a substantially homogeneous mixture is formed. When it is desired to prepare a liquid shortening composition (as distinguished from a plastic or solid shortening) which contains the acidic lipid alkyl carbonates, it is preferable to incorporate therein, additionally, an alpha-phase crystal tending emulsifier in amounts of from about 0.5% to about 15%, by weight of the shortening. The alpha-phase crystal tending emulsifier cooperates with the acidic lipid alkyl carbonate in the air incorporation performance of cake batters.

The alpha-phase crystal tending emulsifiers used in this invention are to be distinguished from fatty materials having predominantly beta or beta-prime crystal tending phases. These types of crystalline structures can be identified by their X-ray diffraction patterns and are described in an article by E. S. Lutton in the Journal of the American Chemical Society, vol. 67, p. 524 (1945), and in U.S. Patents 2,521,241–2, granted to Mitchell, Sept. 5, 1950. The alpha crystalline form is the least stable, least dense, and lowest melting of these crystalline forms. The alpha-phase crystal tending emulsifiers used in this invention are both lipophilic and hydrophilic and contain in the molecule at least one higher fatty acid radical having from about 12 to about 22 carbon atoms and at least one free and unesterified hydroxyl group.

Among the alpha-phase crystal tending emulsifiers which can be used in the practice of this invention are the following classes of materials:

(a) A monoester of a straight chain aliphatic diol with a saturated fatty acid, said diol containing from 3 to 5 carbon atoms and said saturated fatty acid having from about 12 to about 22 carbon atoms, such as propylene glycol monostearate;

(b) A condensation product of a monohydroxy-monocarboxylic acid having from 2 to 6 carbon atoms with a partial fatty acid glyceride containing an average of from 1 to 2 fatty acid radicals having from about 12 to about 22 carbon atoms, such as monoglyceridyl lactate or lactostearin;

(c) A 1,3-diglyceride containing a saturated fatty acid having from about 16 to about 22 carbon atoms and a saturated fatty acid having from 2 to 4 carbon atoms such as 1-acetyl-3-monostearin;

(d) A 1,2-diglyceride containing a saturated fatty acid having from about 16 to about 22 carbon atoms and a saturated fatty acid having from about 12 to about 18 carbon atoms, such as 1,2-distearin; and (e) A fatty acid monoester of diethylene glycol, said fatty acid having from about 12 to about 22 carbon atoms, such as diethylene glycol monostearate.

The following examples further illustrate this invention, but the invention is not limited to these specific examples; many other examples will become readily apparent to the person skilled in the art after reading this specification and the appended claims. All percentages and parts are by weight unless otherwise specified.

Example 1

The synthesis of each of the following acidic lipid alkyl carbonates was accomplished in essentially the same manner with necessary variations as indicated. In a round-bottomed flask equipped with a thermometer, a stirrer, an addition funnel and a nitrogen inlet were placed equimolar (or equivalent) amounts of acidic lipid condensation product and triethylamine dissolved in an appropriate amount of anhydrous ether or a mixture of anhydrous ether and anhydrous benzene as indicated. This solution was cooled to 0° C.–15° C. in an ice bath and then an equimolar (or equivalent) amount of ethyl chloroformate was added dropwise at such a rate that the temperature did not rise above 15° C. After the chloroformate had been added, the reaction mixture was stirred for an additional 15–60 minutes at 0° C.–15° C. and was then filtered to remove the triethylamine hydrochloride precipitate. Evaporation of the solvent at room temperature under vacuum gave the acidic lipid alkyl carbonate.

(a) Treatment of 13.6 g. (0.020 mole) of tartaric distearate, 4.1 g. (.040 mole) of triethylamine and 4.4 g. (0.040 mole) of ethyl chloroformate in a total of 400 ml. of ether in the above manner gave 11.2 g. (68%) of 2,3-distearoyloxysuccinyl bis-(ethyl carbonate).

(b) In the same manner as in (a), 22.1 g. (0.050 mole) of stearoyl propylene glycol hydrogen succinate, 5.1 g. (0.050 mole) of triethylamine and 5.4 g. (0.050 mole) of ethyl chloroformate gave 20.7 g. (81%) of stearoyl propylene glycol succinatyl ethyl carbonate.

(c) Treatment of 7.2 g. (0.010 mole) of distearin hydrogen succinate, 1.0 g. (0.010 mole) of triethylamine and 1.1 g. (0.010 mole) of ethyl chloroformate in a mixture of 100 ml. of benzene and 60 ml. of ether in the above manner gave distearin succinatyl ethyl carbonate.

(d) In the same manner as in (c), 11.1 g. (0.030 mole) of 4-stearoyloxybutyric acid, 3.1 g. (0.030 mole) of triethylamine and 3.3 g. (0.030 mole) of ethyl chloroformate gave 10.8 g. (81%) of 4-stearoyloxybutyryl ethyl carbonate.

The acidic lipid alkyl carbonate structure of the compounds prepared in Example 1 was confirmed by infrared spectra analysis.

Example 2

In a manner similar to Example 1(c), octadecyl glutaratyl ethyl carbonate was prepared from 4.3 g. (0.01 mole) of octadecyl hydrogen glutarate, 1.0 g. (0.010 mole) of triethylamine and 1.1 g. (0.010 mole) of ethyl chloroformate. Similarly, using the appropriate proportions of reactants, stearoyl propylene glycol adipatyl ethyl carbonate was prepared from stearoyl propylene glycol hydrogen adipate; stearoyloxysuccinyl bis-(ethyl carbonate) was prepared from malic stearate; stearoyl ethyl carbonate was prepared from stearic acid; 12-hydroxystearoyl ethyl carbonate was prepared from 12-hydroxystearic acid; stearoyl 1,3-propanediol succinatyl ethyl carbonate was prepared from stearoyl 1,3-propanediol hydrogen succinate; dipalmitin succinatyl ethyl carbonate was prepared from dipalmitin hydrogen succinate; and stearoyl dihydroxy ethyl ether succinatyl ethyl carbonate was prepared from stearoyl dihydroxy ethyl ether hydrogen succinate. Myristyl and behenyl radicals can be substituted for equivalent amounts of palmityl and stearyl radicals in the acidic lipid residues of the carbonates of the above example to give corresponding carbonates. Stearyl chloroformate can be substituted for an equivalent amount of ethyl chloroformate in the above example to give corresponding carbonates.

Example 3

The effectiveness of the compounds of this invention as shortening additives and as cake batter stabilizers is illustrated with a liquid vegetable oil shortening and with both low-ratio and high-ratio white and yellow cake mixes employing the distearin succinatyl ethyl carbonate of Example 1(c).

(a) A fluid shortening was prepared by uniformly mixing together the following components in the stated amounts:

| Components | Parts by weight |
|---|---|
| Refined, bleached and deodorized liquid cottonseed oil | 84 |
| Propylene glycol stearate (approximately ½ each mono- and diesters) | 14 |
| Distearin succinatyl ethyl carbonate | 2 |

This shortening is useful for the commercial and household preparation of bakery products such as bread, cakes, pies, doughnuts, cookies, icings, fillings, and the like products made from emulsions comprising water, fats, proteins and/or carbohydrates. Parts (b), (c), (d) and (e) below illustrate low-ratio white and yellow cake mixes and high-ratio quick method white and yellow cake mixes, respectively, using the liquid shortening of part (a) for the preparation of high volume cakes.

(b) White cakes were prepared from the following ingredients:

| Ingredients | Parts by weight, grams |
|---|---|
| Granulated sugar (sucrose) | 116.5 |
| Shortening | 31.2 |
| Dextrose | 5.7 |
| Non-fat milk solids | 8.5 |
| Salt (NaCl) | 2.3 |
| Double-acting baking powder | 7.25 |
| Cake flour | 115.0 |
| Flavor | 0.25 |
| Egg whites (fresh) | 30.0 |

The shortening and egg whites were added to a mixture of the dry ingredients and then 150 ml. of water was mixed in with an electric mixer at 500 r.p.m. for 3 minutes. 440 grams of batter was placed in an 8-inch pan and baked in an oven at 375° F. for about 25 minutes. The batter density was 0.55 g./cc. and the cake volume 20 minutes after removal of the cake from the oven was 1445 cc./440 g. of batter. The cake had a fine texture.

(c) In the same manner, a yellow cake mix produced a batter density of 0.57 g./cc. and a cake volume of 1485 cc./440 g. of batter. The yellow cake formula was similar to the white cake formula except that it contained 24 grams of whole fresh eggs in place of 30 grams of fresh egg whites.

(d) A high-ratio quick method white cake was prepared from the following ingredients:

| Ingredients | Parts by weight, grams |
|---|---|
| Cake flour | 107.0 |
| Granulated sugar (sucrose) | 133.0 |
| Salt (NaCl) | 2.5 |
| Double-acting baking powder | 6.7 |
| Shortening | 47.5 |
| Whole milk | 130.0 |
| Egg whites (fresh) | 60.0 |
| Flavor | 2.5 |

The shortening and other liquid ingredients (milk and egg whites) were added simultaneously to all of the dry ingredients and mixed with a Sunbeam table model electric mixer at 500 r.p.m. for a total of 4 minutes. 400 grams of batter was placed in an 8-inch pan and baked in an oven at 365° F. for about 25 minutes. The batter density was 0.54 g./cc. and the cake volume 20 minutes after removal of the cake from the oven was 1450 cc./400 g. of batter.

(e) In the same manner, a high-ratio quick method yellow cake produced a batter density of 0.54 g./cc. and a cake volume of 1440 cc./400 g. of batter. The yellow cake formula was similar to the white cake formula except that it contained 48 grams of whole fresh eggs in place of 60 grams of fresh egg whites.

Similar good cake baking results as obtained in Example 3 when the distearin succinatyl ethyl carbonate is employed in a plasticized vegetable oil shortening consisting of a blend of 85 parts soybean and 15 parts cottonseed oil partially hydrogenated to an iodine value of 70–75.

*Example 4*

The effectiveness of several other examples of the compounds of this invention in high-ratio quick method white cakes is illustrated in this example. For purposes of comparison, the control cake which did not contain the acidic lipid alkyl carbonate had a volume of 930 cc./400 g. of batter.

(a) 2% stearoyl propylene glycol succinatyl ethyl carbonate in the carbonate in the shortening component produced a cake volume of 1490 cc./400 g. of batter.

(b) 2% stearoyl propylene glycol adipatyl ethyl carbonate in the shortening component produced a cake volume of 1405 cc./400 g. of batter.

(c) 2% 4-stearoyloxybutyryl ethyl carbonate in the shortening component produced a cake volume of 1515 cc./400 g. of batter.

(d) 2% stearoyloxysuccinyl bis-(ethyl carbonate) in the shortening component produced a cake volume of 1455 cc./400 g. of batter.

(e) 2% 2,3 - distearoyloxysuccinyl bis-(ethyl carbonate) in the shortening component produced a cake volume of 1405 cc./400 g. of batter.

(f) 1% octadecyl glutaratyl ethyl carbonate in the shortening component produced a cake volume of 1475 cc./400 g. of batter.

(g) 2% 12 - hydroxystearoyl ethyl carbonate in the shortening component produced a cake volume of 1230 cc./400 g. of batter.

(h) 1% stearoyl ethyl carbonate in the shortening component produced a cake volume of 1355 cc./400 g. of batter.

(i) 2% distearin succinatyl ethyl carbonate in the shortening component produced a cake volume of 1450 cc./400 g. of batter.

(j) 0.5% stearoyl propylene glycol succinatyl ethyl carbonate in the shortening component produced a cake volume of 1320 cc./400 g. of batter.

Similar high volume cakes are obtained when the other acidic lipid alkyl carbonates of Examples 1 and 2 are substituted for the acidic lipid alkyl carbonate of Example 4.

Similar good cake baking results are also obtained as in Example 4 when the acidic lipid alkyl carbonate is employed as a separate dry ingredient in the cake mix instead of pre-admixture with the shortening component of the cake mix. Examples of such dry cake mixes are chocolate, yellow, spice, white and other cake mixes comprising, for example, 10%–25% shortening, 30%–50% sugar and 30%–50% flour. Other suitable dry mixes are pound cake and angel cake mixes.

The dry cake mix can also contain suitable amounts of: leavening, for example, 1%–4%; milk solids, for example, 0.5%–5%; egg solids, for example, 0%–4%; and minor amounts of flavoring and coloring. Any of the commonly used granulated or powered sugars such as sucrose, dextrose, maltose, fructose, lactose, and brown and invert sugars can be used in the dry cake mix.

*Example 5*

A specific example of a dry cake mix containing the acidic lipid alkyl carbonates of this invention consists of a mixture of the following ingredients:

| Ingredients | Parts by weight, grams |
|---|---|
| Cake flour | 107.0 |
| Granulated sugar (sucrose) | 133.0 |
| Salt (NaCl) | 2.5 |
| Double-acting baking powder | 6.8 |
| Shortening | 47.5 |
| Flavor | 2.5 |

It is preferable to incorporate the acidic lipid alkyl carbonate in the shortening component although it can also be added to the dry cake mix as a separate component or in admixture with the flour or other dry cake mix ingredients as hereinbefore stated. Any of the above-mentioned shortenings and flours can be used for this purpose although it is preferable to use a bleached cake flour and a plastic shortening. The above dry cake mix ingredients containing additionally, for example, 2% by weight of the shortening of distearin succinatyl ethyl carbonate can be used to prepare a high volume, fine texture high-ratio white cake by adding 130 grams of whole milk and 60 grams of fresh egg whites and mixing to form a batter with a Sunbeam table model electric mixer at 500 r.p.m. for a total of 4 minutes. 400 grams of batter are placed in an 8-inch pan and baked in an oven at 365° F. for about 25 minutes. Using the shortening of Example 3(c) the cake volume 20 minutes after removal of the cake from the oven is from about 1400 to 1500 cc./400 g. of batter.

The following example specifically describes the preparation of a low-ratio, dry white cake mix containing one of the acidic lipid alkyl carbonates of this invention which is suitable for the preparation of high volume, fine texture white cakes.

Example 6

A dry white cake mix was prepared from the following ingredients:

| Ingredients | Percent by weight |
|---|---|
| Cake flour | 40.70 |
| Powdered sugar | 41.35 |
| Shortening [1] | 11.00 |
| Nonfat dry milk | 3.00 |
| Dextrose | 1.61 |
| Monocalcium phosphate | 0.41 |
| Sodium acid pyrophosphate | 0.44 |
| Baking soda | 0.59 |
| Salt (NaCl) | 0.80 |
| Flavor | 0.10 |
| | 100.00 |

[1] Shortening: 14% propylene glycol stearate (½ each mono- and diesters) plus 2% 12-hydroxystearoyl ethyl carbonate in liquid cottonseed oil.

*Preparation of dry mix:*

The liquid shortening was heated to 60° C. and added to the powdered sugar; blending was carried out in a Hobart mixer at speed #1 using a flat beater until well blended. The cake flour and other ingredients, previously blended together in a Patterson-Kelly "V" blender, were added and blended for an additional 15 minutes. The complete mix was then passed through a sieve to reduce the size of the fat/sugar aggregates which were formed in the initial mixing.

*Batter mixing:*

284 grams of the above dry mix was placed in a one-quart Sunbeam mixing bowl; with the mixer on low speed, 150 ml. of distilled water was added (from a dispensing burette) over a period of 75 seconds. Thirty grams of fresh egg whites was then added and mixing speed was increased to 500 r.p.m. for a period of 3 minutes. The batter density after mixing was 0.68 gram/ml. 440 grams of the batter was scaled into an 8-inch pan and baked in an oven at 365° F. for about 28 to 30 minutes. The hot volume of the cake (determined 30 seconds after removal from the oven) was 1440 cc./440 grams of batter; the cold volume of the cake (determined 15 minutes after removal from the oven) was 1350 cc./440 grams of batter. The contour of the cake crust was slightly mounded with the center being 24 millimeters higher than the edge. The cellular structure of the cake was visually judged to be of medium fineness in comparison with a standard cake cellular scale ranging from very coarse to very fine.

The dry cake mixes of this invention can also be prepared by subjecting the sugar, flour, and shortening ingredients to the simultaneous shearing and crushing forces described in U.S. Patent 2,874,051, granted to Bedenk and Phenix, Feb. 17, 1959. The following example specifically describes the preparation of a high-ratio, dry yellow cake mix containing one of the acidic lipid alkyl carbonates of this invention which is suitable for the preparation of high volume, fine texture yellow cakes.

Example 7

A dry yellow cake mix is prepared having the following composition:

| Ingredients | Percent by weight |
|---|---|
| Sugar (industrial fine, granulated sucrose) | 41.2 |
| Flour (soft wheat cake flour) | 34.3 |
| Shortening [1] | 13.0 |
| Nonfat dry milk solids | 4.0 |
| Salt | 1.0 |
| Soda | 0.64 |
| Monocalcium phosphate (anhydrous) | 0.53 |
| Sodium acid pyrophosphate | 0.53 |
| Dry egg white solids | 1.5 |
| Dry egg yolk solids | 3.2 |
| Flavoring | 0.1 |
| | 100.00 |

[1] The shortening is prepared by melting together the following components and plasticizing by rapidly cooling with agitation:
88% vegetable oil mixture comprising 80% soybean oil and 20% cottonseed oil, which is refined, bleached, deodorized, and hydrogenated to an iodine value of about 70,
3% soybean oil which is superglycerinated to form a mixture containing about 40% monoglyceride, 40% diglyceride, and 20% triglyceride, and hydrogenated to an iodine value of about 80,
6% behenoyl 1,5-pentanediol glutaratyl ethyl carbonate,
3% myristoyl dihydroxy ethyl ether adipatyl isobutyl carbonate.

The dry mix is made by blending together thoroughly the sugar, flour, and shortening in a Hobart mixer and then passing this blend through a roller mill. The roller mill has three rolls revolving at different speeds with a speed ratio of 3 to 1 between the first two rolls, and of 2 to 1 between the second and third rolls. After the milling step the remaining ingredients are added and the final mixture is subjected to an impact grinding to break up any agglomerates or large particles present.

The cake batter is made by adding 1⅓ cups of water to 20 oz. of the dry mix and mixing at medium speed in a Sunbeam mixer for two minutes. The batter is baked in an 8-inch pan at 375° F. to produce a high volume cake.

Example 8

An example of a cream icing which can be prepared with a fluid shortening of this invention consists of the following ingredients:

| Ingredients | Parts by weight |
|---|---|
| Shortening [1] | 88 |
| Nonfat milk solids | 21 |
| Salt (NaCl) | 2 |
| 6X powdered sugar (sucrose) | 335 |
| Water | 59 |

[1] 86% partially hydrogenated soybean oil (iodine value 107), 6% 1-acetyl-3-monostearin, 6% stearoyl propylene glycol succinatyl ethyl carbonate, and 2% 2,3-distearoyloxy-succinyl bis-(ethyl carbonate).

The ingredients are mixed for about 5 minutes with a Hobart C-100 mixer at speed number 1 and scraped down in the mixing bowl at intervals of 2½ minutes. Mixing is then continued for about 10 additional minutes at speed number 2 with the same mixer, with the icing being scraped down at the end of each 5 minute interval, to form a very good, creamy white cake icing having a high specific volume.

Similar good creamy results are obtained with cream fillings.

Example 9

An example of cookies which can be prepared with a plastic shortening of this invention consists of the following recipe:

INGREDIENTS

½ cup shortening [1]
¾ cup brown sugar
1 whole egg
1¼ cups flour
1 teaspoon salt (NaCl)
½ teaspoon baking soda
2 tablespoons water
½ cup chopped nuts
1 cup chocolate chips

[1] 92% partially hydrogenated blend of soybean and cottonseed oils (weight ratio 85:15) having an iodine value of 70 to 75; and 8% octadecyl glutaratyl ethyl carbonate.

INSTRUCTIONS

Blend shortening, sugar, and egg. Add flour and salt to shortening mixture; dissolve soda in water and add to other ingredients. Stir in nuts and chocolate chips, mix thoroughly and drop from a teaspoon to a cookie sheet which has been rubbed with edible grease. Bake in oven at 375° F. for 10 to 12 minutes to produce about 2½ dozen of delicious 2-inch cookies.

Good cookie baking results with positive control of spreading properties and oil binding can also be obtained, for example, with sugar, oatmeal, and coconut type cookies using the acidic lipid alkyl carbonates described herein. The cookie mixes used to prepare these cookies will usually contain about 10%–15% shortening, about 40%–60% flour, and about 25%–50% sugar. The acidic lipid alkyl carbonate is particularly useful in cookie doughs and in baked cookies in which cookie spread or oil drainage is a problem. The following example specifically describes a sugar cookie formulation containing one of the acidic lipid alkyl carbonates of this invention which is suitable for the preparation of a refrigerated cookie dough and for packaged cookies.

Example 10

A dry sugar cookie mix is prepared having the following composition:

| Ingredients: | Parts by weight |
|---|---|
| Sugar (fine, granular) | 135.00 |
| Shortening | 67.50 |
| NaHCO$_3$ | 2.25 |
| NaCl | 2.25 |
| NH$_4$HCO$_3$ | 1.69 |
| Flour | 225.00 |
| Vanilla extract | 2.50 |
| Nonfat milk solids | 6.75 |

It is preferable to incorporate the acidic lipid alkyl carbonate in the shortening component although it can also be added to the dry sugar cookie mix as a separate component or in admixture with the flour or other dry cookie mix ingredients as hereinbefore stated. Any of the abovementioned shortenings and flours can be used for this purpose. The above dry cookie mix ingredients containing, additionally, from about 0.1% to about 15% by weight of the dry mix of acidic lipid alkyl carbonate can be used to prepare a cookie dough by adding a suitable amount of water, preferably from about 20% to about 30%, by weight of the flour. The cookie dough can be stored in refrigerated containers until usage.

In this specific example, the shortening consisted of refined, bleached and deodorized liquid cottonseed oil and the flour was a soft white wheat pastry-type flour. 2% by weight of the shortening of distearin succinatyl ethyl carbonate was blended into the shortening component. The nonfat milk solids, NaCl, NH$_4$HCO$_3$, and vanilla flavoring were incorporated in the dough via the water. The amount of water used was 21% by weight of the flour.

*Method of preparation:*

(1) Cream sugar, shortening, and NaHCO$_3$ in small Hobart bowl for three minutes at speed #2. Scrape sides and paddle after each minute.

(2) Add suspension of nonfat milk solids, NaCl, NH$_4$HCO$_3$, and vanilla flavoring in water; blend at speed #1 for one minute.

(3) Add flour, mix at low speed for two minutes.

(4) Handle dough carefully to avoid compressing and roll once to a thickness of 9 mm.; cut to a diameter of 6 cm. and place on lightly greased tray.

(5) Bake in oven at 400° F. for ten minutes.

The "Spread Factor" is widely used in the cookie baking trade and is used in Cereal Laboratory Methods as the average diameter of six cookies divided by the average thickness. In general, the natural relation is for thickness to decrease as spread increases. This measurement ranks flours adequately for cookie baking potential. See, for example, Sollars and Barrett, Baker's Digest, vol. 38, No. 3, pp. 34–39 (June 1964). In this specific example the ratio of diameter to thickness of the baked cookies according to the above method was 16.1. This is a very desirable cookie spread for a sugar-type cookie and represents a 30% increase over the 12.6 ratio which was obtained with a standard commercially-available plastic shortening used by bakeries and consisting of a partially hydrogenated blend of soybean oil and cottonseed oil. It represents a 10% increase over the 14.8 ratio which was obtained with a standard commercially-available liquid shortening used by bakeries and consisting of lightly hydrogenated soybean oil containing partial glycerol and glycol ester emulsifiers. In addition, the use of the acidic lipid alkyl carbonate substantially improved the baked cookie by binding the oil more firmly in the cookie structure as judged by visual comparison with the above standard shortenings.

Example 11

An example of a pastry crust which can be prepared with the acidic lipid carbonates of this invention comprises 20%–50% directed rearranged lard (produced by the method described in U.S. Patent 2,875,066, granted to Holman and Going, Feb. 24, 1959), 50%–80% unbleached pastry flour, 0% to 3% sugar, and 2% 4-stearoyloxybutyryl ethyl carbonate.

Example 12

An example of a white bread which can be prepared with the acidic lipid carbonates of this invention comprises 50%–60% bleached white bread flour, 35% to 40% milk, 2% to 6% lard as in Example 11, 1% to 2% each of sugar, salt and yeast, and 2% stearoyloxysuccinyl bis-(ethyl carbonate).

The pastry and bread compositions of Examples 11 and 12 are made into doughs in the conventional manner. The use of the acidic lipid alkyl carbonate improves the colloidal properties of the dough during baking of these products and many other bakery products containing proteinaceous, and/or amylaceous, and/or oleaginous bakery constituents as hereinbefore described. Other examples will be apparent to the person skilled in the art and all such variations are included within the scope of this invention as set forth in this specification and the claims appended hereto.

What is claimed is:

1. A bakery composition comprising an edible material selected from the group consisting of amylaceous, proteinaceous, and oleaginous foods in intimate admixture with from about 0.1% to about 15%, by weight of the composition, of an acidic lipid alkyl carbonate having the general formula

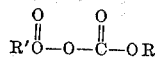

wherein R is selected from the group consisting of alkyl radicals having from 2 to about 30 carbon atoms, and wherein R' is the residue of an acidic lipid selected from the group consisting of
  (a) a fatty acid having from about 12 to about 22 carbon atoms;
  (b) a hydroxy fatty acid having from about 12 to about 22 carbon atoms and from 1 to about 2 hydroxyls;
  (c) a condensation product of a fatty acid having from about 12 to about 22 carbon atoms with a hydroxy-polycarboxylic acid having from 1 to 4 hydroxyl groups, said hydroxy-polycarboxylic acid containing 3 to 6 carbon atoms, said condensation product having at least one free carboxyl group per molecule;
  (d) a condensation product of a dicarboxylic acid having no hydroxyl groups and containing from about 4 to 6 carbon atoms with a straight chain aliphatic α,ω-diol monoester of fatty acid, said diol containing from 3 to 5 carbon atoms, said fatty acid having from about 12 to about 22 carbon atoms, and said condensation product having at least one free carboxyl group per molecule;
  (e) a condensation product of a dicarboxylic acid having no hydroxy groups and containing from about 4 to 6 carbon atoms with a straight chain aliphatic primary-secondary diol monoester of fatty acid, said diol containing from 3 to 5 carbon atoms, said fatty acid having from about 12 to about 22 carbon atoms, and said condensation product having at least one free carboxyl group per molecule;
  (f) a condensation product of a dicarboxylic acid having no hydroxyl groups and containing from about 4 to 6 carbon atoms with a partial fatty acid glyceride containing from one to two fatty acid radicals having from about 12 to about 22 carbon atoms and from zero to one fatty acid radical having from about 2 to about 6 carbon atoms, said condensation product having at least one free carboxyl group per molecule;
  (g) a condensation product of fatty acid containing from about 12 to about 22 carbon atoms with an ω-hydroxy-monocarboxylic acid having from 3 to 6 carbon atoms;
  (h) a condensation product of a dicarboxylic acid having no hydroxyl groups and containing from about 4 to 6 carbon atoms with a straight chain fatty alcohol having from about 12 to about 22 carbon atoms, said condensation product having at least one free carboxyl group per molecule;
  (i) a condensation product of a dicarboxylic acid having no hydroxyl groups and containing from 4 to 6 carbon atoms with a diethylene glycol monoester of fatty acid, said fatty acid having from about 12 to about 22 carbon atoms and said condensation product having at least one free carboxyl group per molecule; and
  (j) mixtures of the above compounds in (a) to (i).

2. A bakery composition comprising an edible material selected from the group consisting of flour and shortening in intimate admixture with from about 0.1% to about 4%, by weight of the flour or shortening, of an acidic lipid alkyl carbonate having the general formula

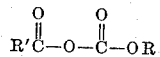

wherein R is selected from the group consisting of alkyl radicals having from 2 to about 30 carbon atoms, and wherein R' is the residue of an acidic lipid selected from the group consisting of
  (a) a fatty acid having from about 12 to about 22 carbon atoms;
  (b) a hydroxy fatty acid having from about 12 to about 22 carbon atoms and from 1 to about 2 hydroxyls;
  (c) a condensation product of a fatty acid having from about 12 to about 22 carbon atoms with a hydroxy-polycarboxylic acid having from 1 to 4 hydroxyl groups, said hydroxy-polycarboxylic acid containing 3 to 6 carbon atoms, said condensation product having at least one free carboxyl group per molecule;
  (d) a condensation product of a dicarboxylic acid having no hydroxyl groups and containing from about 4 to 6 carbon atoms with a straight chain aliphatic α,ω-diol monoester of fatty acid, said diol containing from 3 to 5 carbon atoms, said fatty acid having from about 12 to about 22 carbon atoms, and said condensation product having at least one free carboxyl group per molecule;
  (e) a condensation product of a dicarboxylic acid having no hydroxy groups and containing from about 4 to 6 carbon atoms with a straight chain aliphatic primary-secondary diol monoester of fatty acid, said diol containing from 3 to 5 carbon atoms, said fatty acid having from about 12 to about 22 carbon atoms, and said condensation product having at least one free carboxyl group per molecule;
  (f) a condensation product of a dicarboxylic acid having no hydroxyl groups and containing from about 4 to 6 carbon atoms with a partial fatty acid glyceride containing from one to two fatty acid radicals having from about 12 to about 22 carbon atoms and from zero to one fatty acid radical having from about 2 to about 6 carbon atoms, said condensation product having at least one free carboxyl group per molecule;
  (g) a condensation product of fatty acid containing from about 12 to about 22 carbon atoms with an ω-hydroxy-monocarboxylic acid having from 3 to 6 carbon atoms;
  (h) a condensation product of a dicarboxylic acid having no hydroxyl groups and containing from about 4 to 6 carbon atoms with a straight chain fatty alcohol having from about 12 to about 22 carbon atoms, said condensation product having at least one free carboxyl group per molecule;
  (i) a condensation product of a dicarboxylic acid having no hydroxyl groups and containing from 4 to 6 carbon atoms with a diethylene glycol monoester of fatty acid, said fatty acid having from 12 to 22 carbon atoms and said condensation product having at least one free carboxyl group per molecule; and
  (j) mixtures of the above compounds in (a) to (i).

3. The composition of claim 2 wherein R is an alkyl radical having from 2 to about 6 carbon atoms.

4. The composition of claim 2 wherein R' contains at least one alkyl radical having from about 16 to about 18 carbon atoms.

5. A process for improving a shortening-containing emulsion which comprises incorporating in the emulsion from about 0.1% to about 15%, by weight of the shortening, of an acidic lipid alkyl carbonate having the general formula

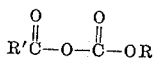

wherein R is selected from the group consisting of alkyl radicals having from 2 to about 30 carbon atoms, and wherein R' is the residue of an acidic lipid selected from the group consisting of
(a) a fatty acid having from about 12 to about 22 carbon atoms;
(b) a hydroxy fatty acid having from about 12 to about 22 carbon atoms and from 1 to about 2 hydroxyls;
(c) a condensation product of a fatty acid having from about 12 to about 22 carbon atoms with a hydroxy-polycarboxylic acid having from 1 to 4 hydroxyl groups, said hydroxy-polycarboxylic acid containing 3 to 6 carbon atoms, said condensation product having at least one free carboxyl group per molecule;
(d) a condensation product of a dicarboxylic acid having no hydroxyl groups and containing from about 4 to 6 carbon atoms with a straight chain aliphatic α,ω-diol monoester of fatty acid, said diol containing from 3 to 5 carbon atoms, said fatty acid having from about 12 to about 22 carbon atoms, and said condensation product having at least one free carboxyl group per molecule;
(e) a condensation product of a dicarboxylic acid having no hydroxy groups and containing from about 4 to 6 carbon atoms with a straight chain aliphatic primary-secondary diol monoester of fatty acid, said diol containing from 3 to 5 carbon atoms, said fatty acid having from about 12 to about 22 carbon atoms, and said condensation product having at least one free carboxyl group per molecule;
(f) a condensation product of a dicarboxylic acid having no hydroxyl groups and containing from about 4 to 6 carbon atoms with a partial fatty acid glyceride containing from one to two fatty acid radicals having from about 12 to about 22 carbon atoms and from zero to one fatty acid radical having from about 2 to about 6 carbon atoms, said condensation product having at least one free carboxyl group per molecule;
(g) a condensation product of fatty acid containing from about 12 to about 22 carbon atoms with an ω-hydroxy-monocarboxylic acid having from 3 to 6 carbon atoms;
(h) a condensation product of a dicarboxylic acid having no hydroxyl groups and containing from about 4 to 6 carbon atoms with a straight chain fatty alcohol having from about 12 to about 22 carbon atoms, said condensation production having at least one free carboxyl group per molecule;
(i) a condensation product of a dicarboxylic acid having no hydroxyl groups and containing from 4 to 6 carbon atoms with a diethylene glycol monoester of fatty acid, said fatty acid having from 12 to 22 carbon atoms and said condensation product having at least one free carboxyl group per molecule; and
(j) mixtures of the above compounds in (a) to (i).

6. A process for improving a shortening-containing emulsion which comprises incorporating in the emulsion from about 0.1% to about 4%, by weight of the shortening, of an acidic lipid alkyl carbonate having the general formula

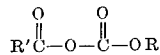

wherein R is selected from the group consisting of alkyl radicals having from 2 to about 30 carbon atoms, and wherein R' is the residue of an acidic lipid selected from the group consisting of
(a) a fatty acid having from about 12 to about 22 carbon atoms;
(b) a hydroxy fatty acid having from about 12 to about 22 carbon atoms and from 1 to about 2 hydroxyls;
(c) a condensation product of a fatty acid having from about 12 to about 22 carbon atoms with a hydroxy-polycarboxylic acid having from 1 to 4 hydroxyl groups, said hydroxy-polycarboxylic acid containing 3 to 6 carbon atoms, said condensation product having at least one free carboxyl group per molecule;
(d) a condensation product of a dicarboxylic acid having no hydroxyl groups and containing from about 4 to 6 carbon atoms with a straight chain aliphatic α,ω-diol monoester of fatty acid, said diol containing from 3 to 5 carbon atoms, said fatty acid having from about 12 to about 22 carbon atoms, and said condensation product having at least one free carboxyl group per molecule;
(e) a condensation product of a dicarboxylic acid having no hydroxy groups and containing from about 4 to 6 carbon atoms with a straight chain aliphatic primary-secondary diol monoester of fatty acid, said diol containing from 3 to 5 carbon atoms, said fatty acid having from about 12 to about 22 carbon atoms, and said condensation product having at least one free carboxyl group per molecule;
(f) a condensation product of a dicarboxylic acid having no hydroxyl groups and containing from about 4 to 6 carbon atoms with a partial fatty acid glyceride containing from one to two fatty acid radicals having from about 12 to about 22 carbon atoms and from zero to one fatty acid radical having from about 2 to about 6 carbon atoms, said condensation product having at least one free carboxyl group per molecule;
(g) a condensation product of fatty acid containing from about 12 to about 22 carbon atoms with an ω-hydroxy-monocarboxylic acid having from 3 to 6 carbon atoms;
(h) a condensation product of a dicarboxylic acid having no hydroxyl groups and containing from about 4 to 6 carbon atoms with a straight chain fatty alcohol having from about 12 to about 22 carbon atoms, said condensation product having at least one free carboxyl group per molecule;
(i) a condensation product of a dicarboxylic acid having no hydroxyl groups and containing from 4 to 6 carbon atoms with a diethylene glycol monoester of fatty acid, said fatty acid having from 12 to 22 carbon atoms and said condensation product having at least one free carboxyl group per molecule; and
(j) mixtures of the above compounds in (a) to (i).

7. A glyceride shortening composition containing as an additive therein from about 0.1% to about 15%, by weight of the composition, of an acidic lipid alkyl carbonate having the general formula

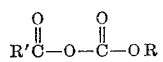

wherein R is selected from the group consisting of alkyl radicals having from 2 to about 30 carbon atoms, and wherein R' is the residue of an acidic lipid selected from the group consisting of
(a) a fatty acid having from about 12 to about 22 carbon atoms;
(b) a hydroxy fatty acid having from about 12 to about 22 carbon atoms and from 1 to about 2 hydroxyls;
(c) a condensation product of a fatty acid having from about 12 to about 22 carbon atoms with a hydroxy-polycarboxylic acid having from 1 to 4 hydroxyl groups, said hydroxy-polycarboxylic acid containing 3 to 6 carbon atoms, said condensation product having at least one free carboxyl group per molecule;
(d) a condensation product of a dicarboxylic acid having no hydroxyl groups and containing from about 4 to 6 carbon atoms with a straight chain aliphatic α,ω-diol monoester of fatty acid, said diol containing from 3 to 5 carbon atoms, said fatty acid having from about 12 to about 22 carbon atoms, and said condensation product having at least one free carboxyl group per molecule;
(e) a condensation product of a dicarboxylic acid having no hydroxy groups and containing from about 4 to 6 carbon atoms with a straight chain aliphatic primary-secondary diol monoester of fatty acid, said diol containing from 3 to 5 carbon atoms, said fatty acid having from about 12 to about 22 carbon atoms, and said condensation product having at least one free carboxyl group per molecule;
(f) a condensation product of a dicarboxylic acid having no hydroxyl groups and containing from about 4 to 6 carbon atoms with a partial fatty acid glyceride containing from one to two fatty acid radicals having from about 12 to about 22 carbon atoms and from zero to one fatty acid radical having from about 2 to about 6 carbon atoms, said condensation product having at least one free carboxyl group per molecule;
(g) a condensation product of fatty acid containing from about 12 to about 22 carbon atoms with an ω-hydroxy-monocarboxylic acid having from 3 to 6 carbon atoms;
(h) a condensation product of a dicarboxylic acid having no hydroxyl groups and containing from about 4 to 6 carbon atoms with a straight chain fatty alcohol having from about 12 to about 22 carbon atoms, said condensation product having at least one free carboxyl group per molecule;
(i) a condensation product of a dicarboxylic acid having no hydroxyl groups and containing from 4 to 6 carbon atoms with a diethylene glycol monoester of fatty acid, said fatty acid having from 12 to 22 carbon atoms and said condensation product having at least one free carboxyl group per molecule; and
(j) mixtures of the above compounds in (a) to (i).

8. The glyceride shortening composition of claim 7 in which the acidic lipid alkyl carbonate is selected from the group consisting of stearoyl propylene glycol succinatyl ethyl carbonate, stearoyl propylene glycol adipatyl ethyl carbonate, 4-stearoyloxybutyryl ethyl carbonate, stearoyloxysuccinyl bis-(ethyl carbonate), 2,3-distearoyloxysuccinyl bis-(ethyl carbonate), octadecyl glutaratyl ethyl carbonate, stearoyl ethyl carbonate, distearin succinatyl ethyl carbonate, 12-hydroxystearoyl ethyl carbonate, stearoyl 1,3-propanediol succinatyl ethyl carbonate, dipalmitin succinatyl ethyl carbonate, and stearoyl dihydroxy ethyl ether succinatyl ethyl carbonate.

9. A liquid glyceride shortening composition containing as additives therein from about 0.5% to about 15%, by weight of the shortening, of an alpha-phase crystal tending emulsifier and from about 0.1% to about 15%, by weight of the shortening, of an acidic lipid alkyl carbonate having the general formula

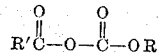

wherein R is selected from the group consisting of alkyl radicals having from 2 to about 30 carbon atoms, and wherein R' is the residue of an acidic lipid selected from the group consisting of
(a) a fatty acid having from about 12 to about 22 carbon atoms;
(b) a hydroxy fatty acid having from about 12 to about 22 carbon atoms and from 1 to about 2 hydroxyls;
(c) a condensation product of a fatty acid having from about 12 to about 22 carbon atoms with a hydroxy-polycarboxylic acid having from 1 to 4 hydroxyl groups, said hydroxy-polycarboxylic acid containing 3 to 6 carbon atoms, said condensation product having at least one free carboxylic group per molecule;
(d) a condensation product of a dicarboxylic acid having no hydroxyl groups and containing from about 4 to 6 carbon atoms with a straight chain aliphatic α,ω-diol monoester of fatty acid, said diol containing from 3 to 5 carbon atoms, said fatty acid having from about 12 to about 22 carbon atoms, and said condensation product having at least one free carboxyl group per molecule;
(e) a condensation product of a dicarboxylic acid having no hydroxy groups and containing from about 4 to 6 carbon atoms with a straight chain aliphatic primary-secondary diol monoester of fatty acid, said diol containing from 3 to 5 carbon atoms, said fatty acid having from about 12 to about 22 carbon atoms, and said condensation product having at least one free carboxyl group per molecule;
(f) a condensation product of a dicarboxylic acid having no hydroxyl groups and containing from about 4 to 6 carbon atoms with a partial fatty acid glyceride containing from one to two fatty acid radicals having from about 12 to about 22 carbon atoms and from zero to one fatty acid radical having from about 2 to about 6 carbon atoms, said condensation product having at least one free carboxyl group per molecule;
(g) a condensation product of fatty acid containing from about 12 to about 22 carbon atoms with an ω-hydroxy-monocarboxylic acid having from 3 to 6 carbon atoms;
(h) a condensation product of a dicarboxylic acid having no hydroxyl groups and containing from about 4 to 6 carbon atoms with a straight chain fatty alcohol having from about 12 to about 22 carbon atoms, said condensation product having at least one free carboxyl group per molecule;
(i) a condensation product of a dicarboxylic acid having no hydroxyl groups and containing from 4 to 6 carbon atoms with a diethylene glycol monoester of fatty acid, said fatty acid having from 12 to 22 carbon atoms and said condensation product having at least one free carboxyl group per molecule; and
(j) mixtures of the above compounds in (a) to (i).

10. The liquid glyceride shortening composition of claim 9 in which the acidic lipid alkyl carbonate is selected from the group consisting of stearoyl propylene glycol succinatyl ethyl carbonate, stearoyl propylene glycol adipatyl ethyl carbonate, 4-stearoyloxybutyryl ethyl carbonate, stearoyloxysuccinyl bis-(ethyl carbonate), 2,3-distearoyloxysuccinyl bis-(ethyl carbonate), octadecyl glutaratyl ethyl carbonate, stearoyl ethyl carbonate, distearin succinatyl ethyl carbonate, 12-hydroxystearoyl ethyl carbonate, stearoyl 1,3-propanediol succinatyl ethyl carbonate, dipalmitin succinatyl ethyl carbonate, and stearoyl dihydroxy ethyl ether succinatyl ethyl carbonate.

11. The liquid glyceride shortening composition of claim 9 in which the alpha-phase crystal tending emulsifier is propylene glycol monostearate.

12. A glyceride shortening composition containing as an additive therein from about 0.1% to about 4%, by weight of the shortening, of an acidic lipid alkyl carbonate having the general formula

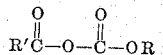

wherein R is selected from the group consisting of alkyl radicals having from 2 to about 30 carbon atoms, and wherein R' is the residue of an acidic lipid selected from the group consisting of
(a) a fatty acid having from about 12 to about 22 carbon atoms;
(b) a hydroxy fatty acid having from about 12 to about 22 carbon atoms and from 1 to about 2 hydroxyls;
(c) a condensation product of a fatty acid having from about 12 to about 22 carbon atoms with a hydroxy-polycarboxylic acid having from 1 to 4 hydroxyl groups, said hydroxy-polycarboxylic acid containing 3 to 6 carbon atoms, said condensation product having at least one free carboxyl group per molecule;

(d) a condensation product of a dicarboxylic acid having no hydroxyl groups and containing from about 4 to 6 carbon atoms with a straight chain aliphatic α,ω-diol monoester of fatty acid, said diol containing from 3 to 5 carbon atoms, said fatty acid having from about 12 to about 22 carbon atoms, and said condensation product having at least one free carboxyl group per molecule;

(e) a condensation product of a dicarboxylic acid having no hydroxy groups and containing from about 4 to 6 carbon atoms with a straight chain aliphatic primary-secondary diol monoester of fatty acid, said diol containing from 3 to 5 carbon atoms, said fatty acid having from about 12 to about 22 carbon atoms, and said condensation product having at least one free carboxyl group per molecule;

(f) a condensation product of a dicarboxylic acid having no hydroxyl groups and containing from about 4 to 6 carbon atoms with a partial fatty acid glyceride containing from one to two fatty acid radicals having from about 12 to about 22 carbon atoms and from zero to one fatty acid radical having from about 2 to about 6 carbon atoms, said condensation product having at least one free carboxyl group per molecule;

(g) a condensation product of fatty acid containing from about 12 to about 22 carbon atoms with an ω-hydroxy-monocarboxylic acid having from 3 to 6 carbon atoms;

(h) a condensation product of a dicarboxylic acid having no hydroxyl groups and containing from about 4 to 6 carbon atoms with a straight chain fatty alcohol having from about 12 to about 22 carbon atoms, said condensation product having at least one free carboxyl group per molecule;

(i) a condensation product of a dicarboxylic acid having no hydroxyl groups and containing from 4 to 6 carbon atoms with a diethylene glycol monoester of fatty acid, said fatty acid having from 12 to 22 carbon atoms and said condensation product having at least one free carboxyl group per molecule; and (j) mixtures of the above compounds in (a) to (i).

13. The glyceride shortening composition of claim 12 in which the acidic lipid alkyl carbonate is selected from the group consisting of stearoyl propylene glycol succinatyl ethyl carbonate, stearoyl propylene glycol adipatyl ethyl carbonate, 4-stearoyloxybutyryl ethyl carbonate, stearoyloxysuccinyl bis-(ethyl carbonate), 2,3-distearoyloxysuccinyl bis-(ethyl carbonate), octadecyl glutaratyl ethyl carbonate, stearoyl ethyl carbonate, distearin succinatyl ethyl carbonate, 12-hydroxystearoyl ethyl carbonate, stearoyl 1,3-propanediol succinatyl ethyl carbonate, dipalmitin succinatyl ethyl carbonate, and stearoyl dihydroxy ethyl ether succinatyl ethyl carbonate.

14. A liquid glyceride shortening composition containing as additives therein from about 0.1% to about 4%, by weight of the shortening, of an alpha-phase crystal tending emulsifier and from about 0.1% to about 15%, by weight of the shortening, of an acidic lipid alkyl carbonate having the general formula

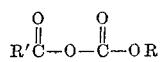

wherein R is selected from the group consisting of alkyl radicals having from 2 to about 30 carbon atoms, and wherein R′ is the residue of an acidic lipid selected from the group consisting of (a) a fatty acid having from about 12 to about 22 carbon atoms;

(b) a hydroxy fatty acid having from about 12 to about 22 carbon atoms and from 1 to about 2 hydroxyls;

(c) a condensation product of a fatty acid having from about 12 to about 22 carbon atoms with a hydroxy-polycarboxylic acid having from 1 to 4 hydroxyl groups, said hydroxy-polycarboxylic acid containing 3 to 6 carbon atoms, said condensation product having at least one free carboxyl group per molecule;

(d) a condensation product of a dicarboxylic acid having no hydroxyl groups and containing from about 4 to 6 carbon atoms with a straight chain aliphatic α,ω-diol monoester of fatty acid, said diol containing from 3 to 5 carbon atoms, said fatty acid having from about 12 to about 22 carbon atoms, and said condensation product having at least one free carboxyl group per molecule;

(e) a condensation product of a dicarboxylic acid having no hydroxy groups and containing from about 4 to 6 carbon atoms with a straight chain aliphatic primary-secondary diol monoester of fatty acid, said diol containing from 3 to 5 carbon atoms, said fatty acid having from about 12 to about 22 carbon atoms, and said condensation product having at least one free carboxyl group per molecule;

(f) a condensation product of a dicarboxylic acid having no hydroxyl groups and containing from about 4 to 6 carbon atoms with a partial fatty acid glyceride containing from one to two fatty acid radicals having from about 12 to about 22 carbon atoms and from zero to one fatty acid radical having from about 2 to about 6 carbon atoms, said condensation product having at least one free carboxyl group per molecule;

(g) a condensation product of fatty acid containing from about 12 to about 22 carbon atoms with an ω-hydroxy-monocarboxylic acid having from 3 to 6 carbon atoms;

(h) a condensation product of a dicarboxylic acid having no hydroxyl groups and containing from about 4 to 6 carbon atoms with a straight chain fatty alcohol having from about 12 to about 22 carbon atoms, said condensation product having at least one free carboxyl group per molecule;

(i) a condensation product of a dicarboxylic acid having no hydroxyl groups and containing from 4 to 6 carbon atoms with a diethylene glycol monoester of fatty acid, said fatty acid having from 12 to 22 carbon atoms and said condensation product having at least one free carboxyl group per molecule; and (j) mixtures of the above compounds in (a) to (i).

15. The liquid glyceride shortening composition of claim 14 in which the acidic lipid alkyl carbonate is selected from the group consisting of stearoyl propylene glycol succinatyl ethyl carbonate, stearoyl propylene glycol adipatyl ethyl carbonate, 4-stearoyloxybutyryl ethyl carbonate, stearoyloxysuccinyl bis-(ethyl carbonate), 2,3-distearoyloxysuccinyl bis-(ethyl carbonate), octadecyl glutaratyl ethyl carbonate, stearoyl ethyl carbonate, distearin succinatyl ethyl carbonate, 12-hydroxystearoyl ethyl carbonate, stearoyl 1,3-propanediol succinatyl ethyl carbonate, dipalmitin succinatyl ethyl carbonate, and stearoyl dihydroxy ethyl ether succinatyl ethyl carbonate.

16. The liquid glyceride shortening composition of claim 14 in which the alpha-phase crystal tending emulsifier is propylene glycol monostearate.

17. A dry prepared culinary mix comprising flour, sugar and shortening containing as an additive therein from about 0.1% to about 15%, by weight of the mix, of an acidic lipid alkyl carbonate having the general formula $$R'\overset{O}{\underset{\|}{C}}-O-\overset{O}{\underset{\|}{C}}-OR$$

wherein R is selected from the group consisting of alkyl radicals having from 2 to about 30 carbon atoms, and wherein R′ is the residue of an acidic lipid selected from the group consisting of (a) a fatty acid having from about 12 to about 22 carbon atoms;
(b) a hydroxy fatty acid having from about 12 to about 22 carbon atoms and from 1 to about 2 hydroxyls;
(c) a condensation product of a fatty acid having from about 12 to about 22 carbon atoms with a hydroxy-polycarboxylic acid having from 1 to 4 hydroxyl groups, said hydroxy-polycarboxylic acid containing 3 to 6 carbon atoms, said condensation product having at least one free carboxyl group per molecule;
(d) a condensation product of a dicarboxylic acid having no hydroxyl groups and containing from about 4 to 6 carbon atoms with a straight chain aliphatic $\alpha,\omega$-diol monoester of fatty acid, said diol containing from 3 to 5 carbon atoms, said fatty acid having from about 12 to about 22 carbon atoms, and said condensation product having at least one free carboxyl group per molecule;
(e) a condensation product of a dicarboxylic acid having no hydroxy groups and containing from about 4 to 6 carbon atoms with a straight chain aliphatic primary-secondary diol monoester of fatty acid, said diol containing from 3 to 5 carbon atoms, said fatty acid having from about 12 to about 22 carbon atoms, and said condensation product having at least one free carboxyl group per molecule;
(f) a condensation product of a dicarboxylic acid having no hydroxyl groups and containing from about 4 to 6 carbon atoms with a partial fatty acid glyceride containing from one to two fatty acid radicals having from about 12 to about 22 carbon atoms and from zero to one fatty acid radical having from about 2 to about 6 carbon atoms, said condensation product having at least one free carboxyl group per molecule;
(g) a condensation product of fatty acid containing from about 12 to about 22 carbon atoms with an $\omega$-hydroxy-monocarboxylic acid having from 3 to 6 carbon atoms;
(h) a condensation product of a dicarboxylic acid having no hydroxyl groups and containing from about 4 to 6 carbon atoms with a straight chain fatty alcohol having from about 12 to about 22 carbon atoms, said condensation product having at least one free carboxyl group per molecule;
(i) a condensation product of a dicarboxylic acid having no hydroxyl groups and containing from 4 to 6 carbon atoms with a diethylene glycol monoester of fatty acid, said fatty acid having from 12 to 22 carbon atoms and said condensation product having at least one free carboxyl group per molecule; and
(j) mixtures of the above compounds in (a) to (i).

18. A dry prepared culinary mix comprising flour, sugar, and shortening containing as an additive therein from about 0.1% to about 4%, by weight of the shortening, of an acidic lipid alkyl carbonate having the general formula

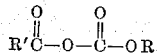

wherein R is selected from the group consisting of alkyl radicals having from 2 to about 30 carbon atoms, and wherein R' is the residue of an acidic lipid selected from the group consisting of
(a) a fatty acid having from about 12 to about 22 carbon atoms;
(b) a hydroxy fatty acid having from about 12 to about 22 carbon atoms and from 1 to about 2 hydroxyls;
(c) a condensation product of a fatty acid having from about 12 to about 22 carbon atoms with a hydroxy-polycarboxylic acid having from 1 to 4 hydroxyl groups, said hydroxy-polycarboxylic acid containing 3 to 6 carbon atoms, said condensation product having at least one free carboxyl group per molecule;
(d) a condensation product of a dicarboxylic acid having no hydroxyl groups and containing from about 4 to 6 carbon atoms with a straight chain aliphatic $\alpha,\omega$-diol monoester of fatty acid, said diol containing from 3 to 5 carbon atoms, said fatty acid having from about 12 to about 22 carbon atoms, and said condensation product having at least one free carboxyl group per molecule;
(e) a condensation product of a dicarboxylic acid having no hydroxyl groups and containing from about 4 to 6 carbon atoms with a straight chain aliphatic primary-secondary diol monoester of fatty acid, said diol containing from 3 to 5 carbon atoms, said fatty acid having from about 12 to about 22 carbon atoms, and said condensation product having at least one free carboxyl group per molecule;
(f) a condensation product of a dicarboxylic acid having no hydroxyl groups and containing from about 4 to 6 carbon atoms with a partial fatty acid glyceride containing from one to two fatty acid radicals having from about 12 to about 22 carbon atoms and from zero to one fatty acid radical having from about 2 to about 6 carbon atoms, said condensation product having at least one free carboxyl group per molecule;
(g) a condensation product of fatty acid containing from about 12 to about 22 carbon atoms with an $\omega$-hydroxy-monocarboxylic acid having from 3 to 6 carbon atoms;
(h) a condensation product of a dicarboxylic acid having no hydroxyl groups and containing from about 4 to 6 carbon atoms with a straight chain fatty alcohol having from about 12 to about 22 carbon atoms, said condensation product having at least one free carboxyl group per molecule;
(i) a condensation product of a dicarboxylic acid having no hydroxyl groups and containing from 4 to 6 carbon atoms with a diethylene glycol monoester of fatty acid, said fatty acid having from 12 to 22 carbon atoms and said condensation product having at least one free carboxyl group per molecule; and
(j) mixtures of the above compounds in (a) to (i).

19. A dry prepared culinary mix comprising flour, sugar and shortening containing as an additive therein from about 0.1% to about 4%, by weight of the shortening, of acidic lipid alkyl carbonate selected from the group consisting of stearoyl propylene glycol succinatyl ethyl carbonate, stearoyl propylene glycol adipatyl ethyl carbonate, 4-stearoyloxybutyryl ethyl carbonate, stearoyloxysuccinyl bis-(ethyl carbonate), 2,3-distearoyloxysuccinyl bis-(ethyl carbonate), octadecyl glutaratyl ethyl carbonate, stearoyl ethyl carbonate, distearin succinatyl ethyl carbonate, 12-hydroxystearoyl ethyl carbonate, stearoyl 1,3-propanediol succinatyl ethyl carbonate, dipalmi in succinatyl ethyl carbonate, and stearoyl dihydroxy ethyl ether succinatyl ethyl carbonate.

20. A dry prepared cake mix comprising flour, sugar and shortening containing as an additive therein from about 0.1% to about 15%, by weight of the mix, of an acidic lipid alkyl carbonate having the general formula

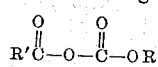

wherein R is selected from the group consisting of alkyl radicals having from 2 to about 30 carbon atoms, and wherein R' is the residue of an acidic lipid selected from the group consisting of
(a) a fatty acid having from about 12 to about 22 carbon atoms;
(b) a hydroxy fatty acid having from about 12 to about 22 carbon atoms and from 1 to about 2 hydroxyls;
(c) a condensation product of a fatty acid having from about 12 to about 22 carbon atoms with a hydroxy-polycarboxylic acid having from 1 to 4 hydroxyl groups, said hydroxy-polycarboxylic acid containing 3 to 6 carbon atoms, said condensation product having at least one free carboxyl group per molecule;
(d) a condensation product of a dicarboxylic acid having no hydroxyl groups and containing from about 4 to 6 carbon atoms with a straight chain aliphatic $\alpha,\omega$-diol monoester of fatty acid, said diol containing from 3 to 5 carbon atoms, said fatty acid having from about 12 to about 22 carbon atoms, and said condensation product having at least one free carboxyl group per molecule;
(e) a condensation product of a dicarboxylic acid having no hydroxy groups and containing from about 4 to 6 carbon atoms with a straight chain aliphatic primary-secondary diol monoester of fatty acid, said diol containing from 3 to 5 carbon atoms, and said fatty acid having from about 12 to about 22 carbon atoms, and said condensation product having at least one free carboxyl group per molecule;
(f) a condensation product of a dicarboxylic acid having no hydroxyl groups and containing from about 4 to 6 carbon atoms with a partial fatty acid glyceride containing from one to two fatty acid radicals having from about 12 to about 22 carbon atoms and from zero to one fatty acid radical having from about 2 to about 6 carbon atoms, said condensation product having at least one free carboxyl group per molecule;
(g) a condensation product of fatty acid containing from about 12 to about 22 carbon atoms with an $\omega$-hydroxy-monocarboxylic acid having from 3 to 6 carbon atoms;
(h) a condensation product of a dicarboxylic acid having no hydroxyl groups and containing from about 4 to 6 carbon atoms with a straight chain fatty alcohol having from about 12 to about 22 carbon atoms, said condensation product having at least one free carboxyl group per molcule;
(i) a condensation product of a dicarboxylic acid having no hydroxyl groups and containing from 4 to 6 carbon atoms with a diethylene glycol monoester of fatty acid, said fatty acid having from 12 to 22 carbon atoms and said condensation product having at least one free carboxyl group per molecule; and
(j) mixtures of the above compounds in (a) to (i).

21. A dry prepared cake mix comprising flour, sugar, and shortening containing as an additive therein from about 0.1% to about 4%, by weight of the shortening, of an acidic lipid alkyl carbonate having the general formula

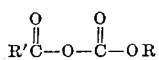

wherein R is selected from the group consisting of alkyl radicals having from 2 to about 30 carbon atoms, and wherein R' is the residue of an acidic lipid selected from the group consisting of
(a) a fatty acid having from about 12 to about 22 carbon atoms;
(b) a hydroxy fatty acid having from about 12 to about 22 carbon atoms and from 1 to about 2 hydroxyls;
(c) a condensation product of a fatty acid having from about 12 to about 22 carbon atoms with a hydroxy-polycarboxylic acid having from 1 to 4 hydroxyl groups, said hydroxy-polycarboxylic acid containing 3 to 6 carbon atoms, said condensation product having at least one free carboxyl group per molecule;
(d) a condensation product of a dicarboxylic acid having no hydroxyl groups and containing from about 4 to 6 carbon atoms with a straight chain aliphatic $\alpha,\omega$-diol monoester of fatty acid, said diol containing from 3 to 5 carbon atoms, said fatty acid having about 12 to about 22 carbon atoms, and said condensation product having at least one free carboxyl group per molecule;
(e) a condensation product of a dicarboxylic acid having no hydroxy groups and containing from about 4 to 6 carbon atoms with a straight chain aliphatic primary-secondary diol monoester of fatty acid, said diol containing from 3 to 5 carbon atoms, said fatty acid having from about 12 to about 22 carbon atoms, and said condensation product having at least one free carboxyl group per molecule;
(f) a condensation product of a dicarboxylic acid having no hydroxyl groups and containing from about 4 to 6 carbon atoms with a partial fatty acid glyceride containing from one to two fatty acid radicals having from about 12 to about 22 carbon atoms and from zero to one fatty acid radical having from about 2 to about 6 carbon atoms, said condensation product having at least one free carboxyl group per molecule;
(g) a condensation product of fatty acid containing from about 12 to about 22 carbon atoms with an $\omega$-hydroxy-monocarboxylic acid having from 3 to 6 carbon atoms;
(h) a condensation product of a dicarboxylic acid having no hydroxyl groups and containing from about 4 to 6 carbon atoms with a straight chain fatty alcohol having from about 12 to about 22 carbon atoms, said condensation product having at least one free carboxyl group per molecule;
(i) a condensation product of a dicarboxylic acid having no hydroxyl groups and containing from 4 to 6 carbon atoms with a diethylene glycol monoester of fatty acid, said fatty acid having from 12 to 22 carbon atoms and said condensation product having at least one free carboxyl group per molecule; and
(j) mixtures of the above compounds in (a) to (i).

22. A dry prepared cake mix comprising flour, sugar and shortening containing as an additive therein from about 0.1% to about 4%, by weight of the shortening, of acidic lipid alkyl carbonate selected from the group consisting of stearoyl propylene glycol succinatyl ethyl carbonate, stearoyl propylene glycol adipatyl ethyl carbonate, 4-stearoyloxybutyryl ethyl carbonate, stearoyl-oxysuccinyl bis-(ethyl carbonate), 2,3-distearoyloxysuccinyl bis-(ethyl carbonate), octadecyl glutaratyl ethyl carbonate, stearoyl ethyl carbonate, distearin succinatyl ethyl carbonate, 12-hydroxystearoyl ethyl carbonate, stearoyl 1,3-propanediol succinatyl ethyl carbonate, dipalmitin succinatyl ethyl carbonate, and stearoyl dihydroxy ethyl ether succinatyl ethyl carbonate.

References Cited

UNITED STATES PATENTS 3,168,405  2/1965  Martin et al. _____ 99—91
3,145,107  8/1964  Howard _____ 99—118

OTHER REFERENCES

Longosz et al., "Journal of Organic Chemistry", vol 26, pp. 2161–2164 (1961), Copy in Scientific Library.

MAURICE W. GREENSTEIN, *Primary Examiner.*